United States Patent
Peltola et al.

(10) Patent No.: US 6,782,263 B1
(45) Date of Patent: Aug. 24, 2004

(54) DYNAMIC CHANNEL ALLOCATION METHOD IN CELLULAR RADIO NETWORK AND SYSTEM FOR CHANNEL ALLOCATION

(75) Inventors: Jukka Peltola, Oulu (FI); Harri Posti, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/743,924

(22) PCT Filed: Jul. 15, 1999

(86) PCT No.: PCT/FI99/00628
§ 371 (c)(1),
(2), (4) Date: Mar. 7, 2001

(87) PCT Pub. No.: WO00/04739
PCT Pub. Date: Jan. 27, 2000

(30) Foreign Application Priority Data

Jul. 17, 1998 (FI) .................................................. 981635

(51) Int. Cl.⁷ .............................................. H04Q 7/20
(52) U.S. Cl. ................................ 455/452.1; 455/452.2; 455/453; 455/509; 455/513; 455/62; 455/63.1
(58) Field of Search ......................... 455/452.1, 452.2, 455/453, 62, 63.1, 509, 513, 514

(56) References Cited

U.S. PATENT DOCUMENTS

| | | | |
|---|---|---|---|
| 4,965,850 A | 10/1990 | Schloemer | |
| 5,404,574 A | * 4/1995 | Benveniste | 455/447 |
| 5,471,671 A | 11/1995 | Wang et al. | |
| 5,491,837 A | 2/1996 | Haartsen | |
| 5,839,075 A | * 11/1998 | Haartsen et al. | 455/450 |
| 5,903,848 A | * 5/1999 | Takahashi | 455/512 |
| 5,907,543 A | 5/1999 | Jeon et al. | |
| 6,138,024 A | * 10/2000 | Evans et al. | 455/452.2 |
| 6,259,922 B1 | * 7/2001 | Benveniste | 455/452.1 |

FOREIGN PATENT DOCUMENTS

EP 0 544095 6/1993

* cited by examiner

Primary Examiner—Edward F. Urban
Assistant Examiner—Duy Le
(74) Attorney, Agent, or Firm—Pillsbury Winthrop LLP

(57) ABSTRACT

The invention relates to a channel allocation method and a system for channel allocation in a cellular radio network which comprises at least one base transceiver station (100) and at least one subscriber terminal (104) connected to the base transceiver station. (100) over a bi-directional radio link (108). The invention is characterized in that the impact of a possible channel allocation on the interference level of the cellular radio network is taken into account in the channel allocation decision. This interference control method makes it possible to increase the capacity of a cellular network and to utilize it more efficiently.

8 Claims, 5 Drawing Sheets

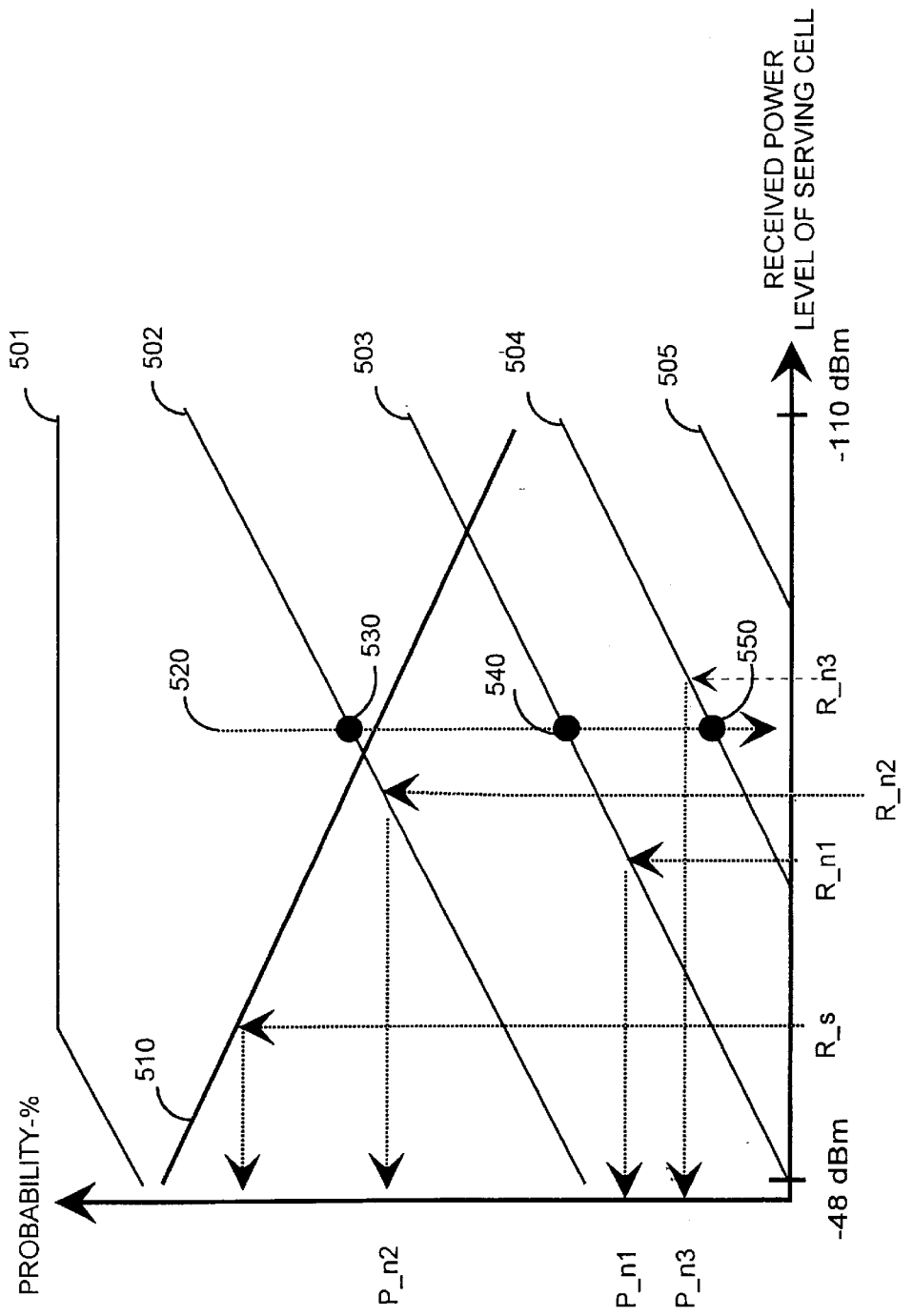

DYNAMIC CHANNEL ALLOCATION METHOD IN CELLULAR RADIO NETWORK AND SYSTEM FOR CHANNEL ALLOCATION

This application is the national phase of international application PCT/FI99/00628 filed Jul. 15, 1999 which designated the U.S.

FIELD OF THE INVENTION

The invention relates to a channel allocation method in a cellular radio network which comprises at least one base transceiver station and at least one subscriber terminal connected to the base transceiver station over a bi-directional radio link.

Further, the invention relates to a system for channel allocation in a cellular radio network which comprises at least one base transceiver station and at least one subscriber terminal connected to the base transceiver station over a bi-directional radio link and a serving cell.

BACKGROUND OF THE INVENTION

One of the key problems in developing cellular radio networks is the limited scope of the available radio spectrum. The aim is to minimize the interference caused by a co-channel signal and an adjacent channel signal by carefully planning the use of radio frequencies. The frequencies are distributed according to various complex models into different cells with the aim to minimize the interference occurring in the radio links and thus maximize the network capacity. In the repetition pattern of a cell, the frequencies of the same or an adjacent channel cannot be too close to each other, because this causes too much interference in the system.

While the use of mobile phones and other subscriber terminals becomes more common, the capacity of networks must constantly be increased. This incurs high cost in form of frequency planning and various measurements.

In a dynamic channel allocation method of prior art, channel allocation is based on the average quality of the ongoing calls at a certain moment, i.e. the quality of each cell equals the average of all calls in the cell in question. The quality class of each cell is defined according to the average of the qualities of calls already connected. The quality class of a cell determines the probabilities to get the call through. Each probability value of channel reservation is between 0 and 1. The final probability P of reserving a channel is the product of the probabilities $P(BTSn)=P_n$ of the adjacent cells 1 ... n, i.e. the total probability $P \in [0,1]$ is $$P=P(BTS1)^* \ldots {}^*P(BTSn)=P_1^* \ldots {}^*P_n$$

The disadvantage of this prior art method is that in practice the decision on channel allocation is made based on the past situation, and no attempt is made to estimate the actual impact of the call to be set up on the cell. If the call is initiated very close to the serving base transceiver station or at the edge of the serving cell, all adjacent cells to the serving cell are not disturbed by it, only the adjacent cells closest to the call to be set up. According to prior art, the decision on the impact of interference is made on the basis of the quality of all ongoing calls in the adjacent cells. This emphasises the interference impact of a call to be set up too much, in particular when the call is initiated very close to the serving base transceiver station or at the edge of the serving cell. However, the call would probably not affect the quality of the calls of other cells if the subscriber terminal was very close to the serving base transceiver station, because both the uplink and the downlink would then have a low transmission power.

BRIEF DESCRIPTION OF THE INVENTION

Thus, it is an object of the invention to develop a method and a system implementing the method in a manner that the above problems are solved. This is achieved by a method of the type described in the introduction, which is characterized in that a channel allocation decision takes into account the impact of a possible channel allocation on the interference level of the cellular radio network, and by a channel allocation system which is characterized in that the serving cell is adapted to allocate channels by estimating the impact of a possible channel allocation on the interference level of the cellular radio network.

The preferred embodiments of the invention are set forth in the dependent claims.

The invention is based on the idea that the decision on channel allocation, i.e. the allocation of a channel for a call, is also at least partly based on an estimate of the actual impact of the call on the interference level of the radio cellular network at least in the immediate surroundings of the serving cell. By estimating the actual impact of each call on the interference level, it is possible to avoid the problem of prior art method to reject a call only because calls in other cells using the same frequencies as the serving cell have a low quality, even though the call would, for instance due to the location of the mobile station in the radio environment, probably not at all reduce the quality of the calls in the other cells. Because the method of the invention tries to estimate the actual impact of the call on the total quality in the cellular network, the call can be accepted regardless of the current quality or interference level in the other cells, if the estimated impact of the call to be set up on the interference level or quality is low.

The interference impact of an incoming call varies considerably depending on where the mobile station is in relation to the serving base transceiver station and the cells which will possibly suffer from interference. If the mobile station is close to the serving base transceiver station, it is probable that the transmission power in both the uplink and the downlink is low and the call will have no major impact on the quality of calls in other cells. If the mobile station is close to the edge of the serving cell, it is probable that it has a greater impact on the quality of the calls in adjacent cells on this side than on the adjacent cells on the other side of the serving cell. In an embodiment of the invention, the estimated impact of a call on individual adjacent cells is weighted in a different way depending on the location of the mobile station in the radio environment, and thus the impact of the radio environment location of the mobile station on the acceptance or rejection probability is taken into account. Thus, in practice, the location of a mobile station in the radio environment determines how well it receives signals from the different cells.

In the first preferred embodiment of the invention, the radio environment location of a mobile station is taken into account in the channel allocation decision by examining the received downlink signal strengths of both the serving cell and the adjacent cells, which are measured in the mobile station. If the signal strength received from an adjacent cell is high, it can be assumed that the impact of a transmission of the mobile station on the adjacent cell in question is also high. If the level of the signal received from an adjacent cell is low, it can be assumed that the interference impact of the mobile station on the adjacent cell in question is also low. Thus, the estimate on the interference impact of an incoming call must increase when the signal strength received from an adjacent cell increases and, correspondingly, decrease when the signal strength decreases. Correspondingly, the estimate on the interference impact on the adjacent cells must decrease when the serving cell signal strength increases and increase when the serving cell signal strength decreases. By combining the estimated impact on individual adjacent cells and the impact estimated on the basis of the serving cell, an estimated impact of an incoming call on the total interference level or quality is obtained and a decision to allocate a channel or reject the call can be made on the basis of this.

The method and system of the invention provide several advantages. A great advantage is that the capacity of the cellular network increases with an efficient reuse of frequencies which is achieved by an efficient selection of channels.

The method of the invention takes into account better than prior art the location in the radio environment of the subscriber terminal accessing the network before the network makes a decision on accepting or rejecting the call. This is done by monitoring the strengths of the received signals of the serving cell and the adjacent cells. With the method of the invention, it is possible to find out the actual cells suffering from interference and the actual interference caused by the call to be set up. The method of the invention efficiently utilizes both the already collected information as a basis for decision-making and the estimate on the impact of the new call. Thus, this advanced interference control method allows a better and more efficient utilization of a cellular network capacity. The method of the invention also reduces quality problems when the subscriber terminal requesting the service is close to the serving base transceiver station. This occurs when the interference impact on the adjacent cells of the call to be set up is estimated to be low. In such a case, the call can be connected to the serving cell regardless of the quality of the adjacent cells, and an unnecessary call rejection is avoided.

The system of the invention provides the same advantages as, described above for the method. It is obvious that the preferred embodiments and specific embodiments can be combined in various combinations to provide the desired technical power.

BRIEF DESCRIPTION OF THE DRAWINGS

In the following, the invention will be described in greater detail in connection with preferred embodiments and with reference to the attached drawings in which FIG. 5 shows a probability table of a three-cell example.

DETAILED DESCRIPTION OF THE INVENTION

Figure 1:
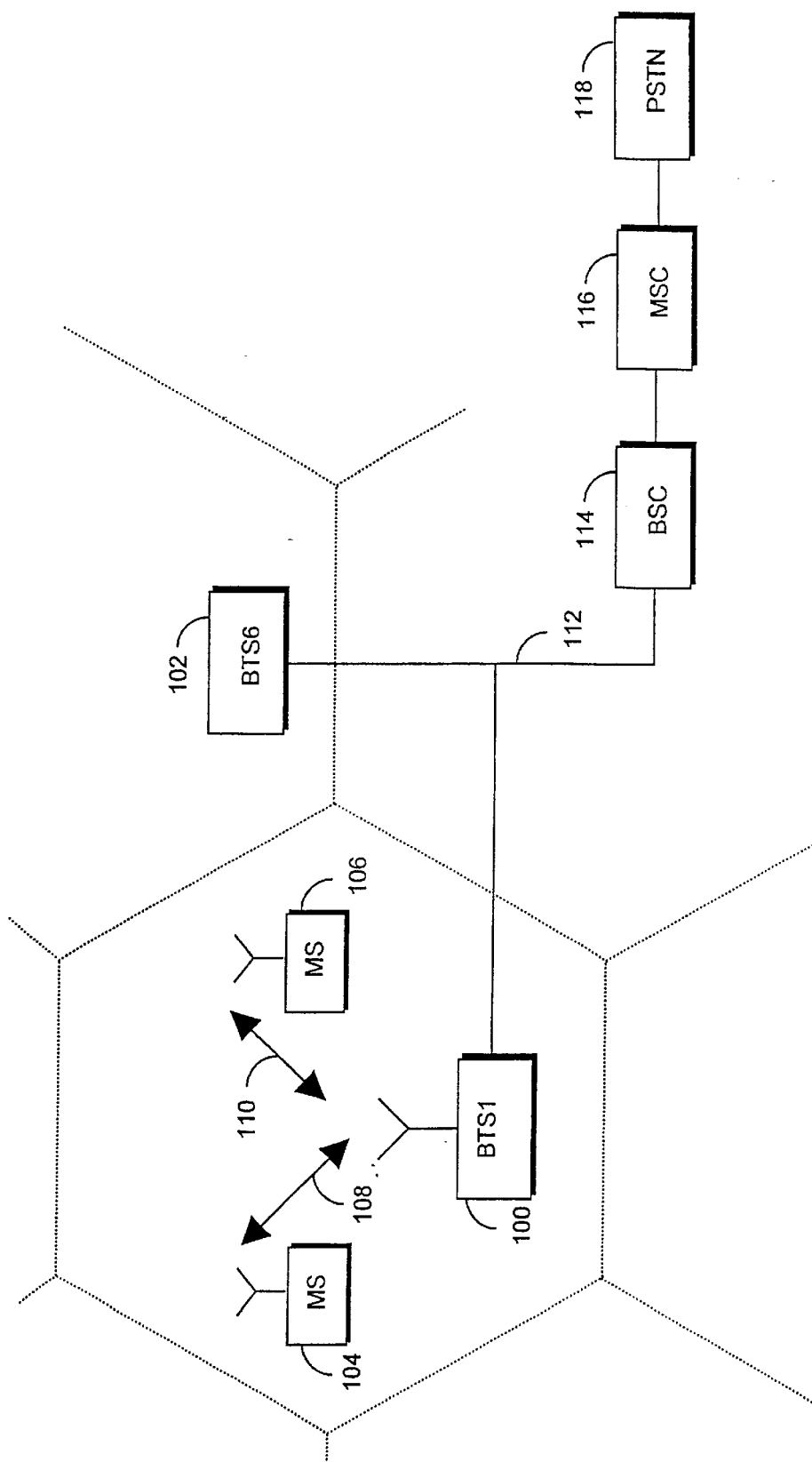
FIG. 1 shows a cellular radio network in general.

FIG. 1 shows an example of a general cellular network structure.

The service areas, i.e. cells, of base transceiver stations 100, 102 are usually modelled as hexagons. Base transceiver stations 100, 102 are possibly connected to a base station controller 114 over a connecting line 112. The task of the base station controller 114 is to control the operation of several base transceiver stations 100, 102. Normally, a base station controller 114 has a connection to a mobile switching centre 116 which has a connection to a public telephone network 118. In office systems, the operations of a base transceiver station 100, a base station controller 114 and even a mobile switching centre 116 can be connected to one apparatus which then is connected to a public network 118, for instance to an exchange of the public network 118. Subscriber terminals 104, 106 in a cell have a bi-directional radio link 108, 110 to the base transceiver station 100 of the cell. In addition, the network part, i.e. the fixed part of the cellular radio network, can comprise additional base transceiver stations, base station controllers, transmission systems and network management systems of various levels. It is obvious to those skilled in the art that a cellular radio network also comprises many other structures which do not require descriptions herein.

Thus, the basic idea of the invention is that a decision on channel allocation is at least partly based on an estimate on the actual impact of a call on the total interference level of a cellular radio network at least in the immediate surroundings of the serving cell. In this case, the following parameters are used as criteria in this predicting channel allocation decision: received signal strengths of the serving cell and the adjacent cells and qualities of the adjacent cells. Thus, the novelty as opposed to prior art is using the RSSI values (Received Signal Strength Indicator), i.e. the received signal strengths, to predict interference.

In the first preferred embodiment of the invention, each adjacent cell and serving cell is given a value for the probability of reserving a channel and the value depends on the signal strength received from the cell. In other words, the probability value $P_n$ of an adjacent cell decreases when the received signal strength increases and increases when the received signal strength decreases. Thus, an assumed high interference impact decreases the probability that a channel be allocated for the mobile station. When the signal strength of the serving cell increases, the probability value $P_s$ of the cell also increases and when the signal level decreases, the probability value $P_s$ decreases. Thus, when the distance from the serving base transceiver station increases, the probability of channel allocation decreases. When these probabilities are combined, a final probability value is obtained for decision-making in which the impact of the call on the total quality of the cellular network is taken into account.

In an embodiment of the invention, the relation between the received power level and probability is preferably illustrated by means of a linear relation. In a further embodiment of the invention, a clarifying and easy-to-use table including quality classes and their pre-calculated probability values is used to assist in defining the channel allocation probability $P_n$. For each cell receiving interference, an average quality is used so that the original probability value P can be calculated. The pre-set initial probability values of quality classes according to the table determine the nominal probabilities for different quality classes.

Figure 2:
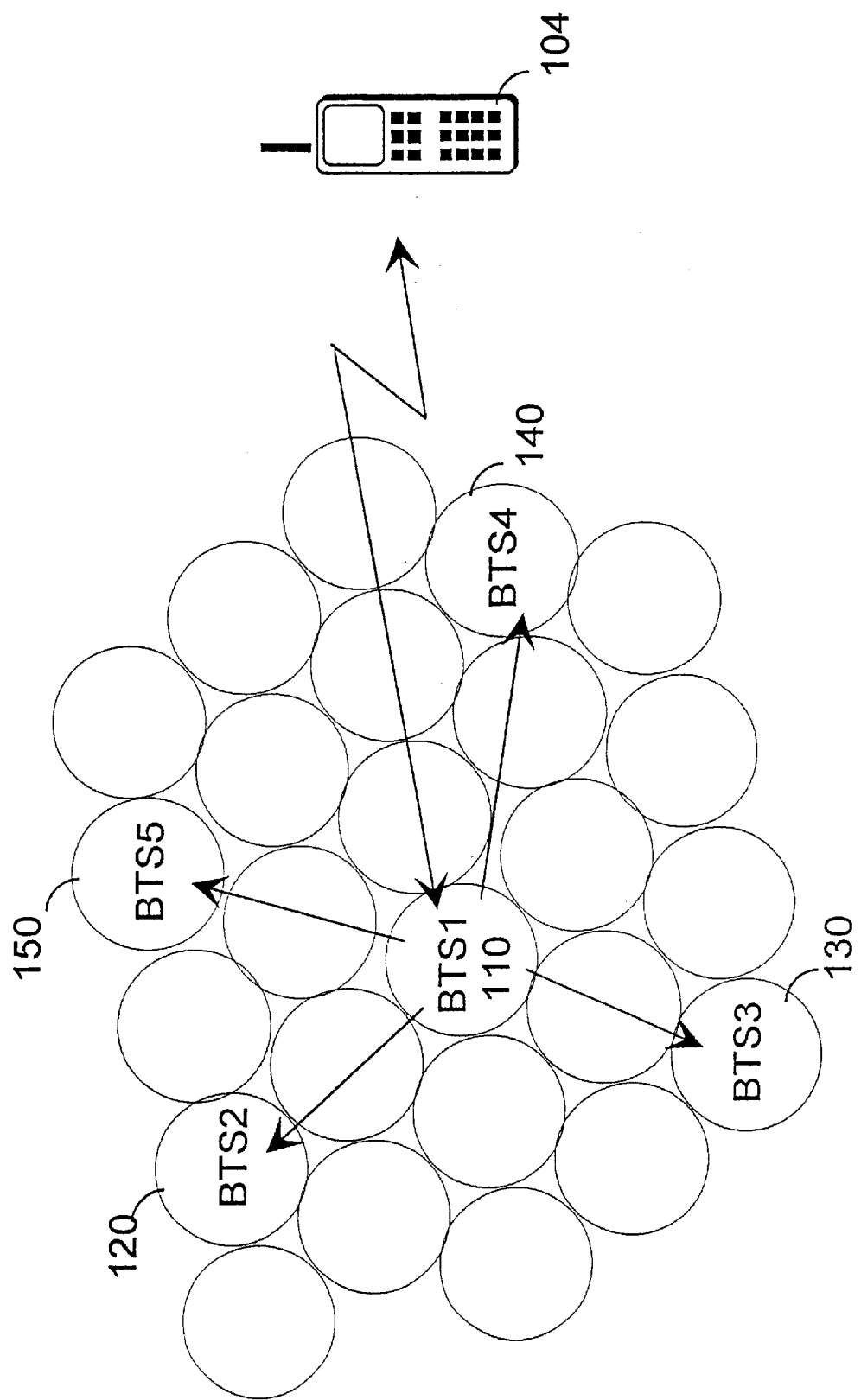
FIG. 2 shows the cellular radio network of the invention.

In the following, the invention is examined more closely with the help of figures. FIG. 2 shows an example of a prior art cellular radio network structure. The cells 110, 120, 130, 140, 150 marked in FIG. 2 use the same frequency group, i.e. the same frequencies. If a call is connected to the serving cell 110, it affects the quality of the calls of the other adjacent cells 120, 130, 140, 150. The probabilities $P_{ni}$ determined on the basis of the quality values of the calls of the adjacent cells 120, 130, 140, 150 and the probabilities $P_s$ of reserving a channel of the serving cell are used to calculate the connection probability P of the call. The quality class of each cell is defined on the basis of the average quality of calls already connected to the adjacent cells 120, 130, 140, 150. Each partial probability value $P_n$ of reserving a channel is between 0 and 1. The total probability P of reserving a channel is the product of the partial probabilities of the quality of calls connected to the adjacent cells 120, 130, 140, 150 $P(BTSn)=P_n \in [0,1]$ multiplied by the probability $P_s$ of reserving a channel of the serving cell, i.e. the total probability P is $$P=P(BTS1)*P(BTS2)*P(BTS3)*P(BTS4)*P_s=P_1*P_2*P_3*P_4*P_s=P_n*P_s.$$

After this, a random number $L \in [0,1]$ is generated with a random number generator or, alternatively, the user pre-sets a threshold value L'. If the random number L or the pre-set threshold value L' is smaller than the probability value P, the call is accepted and a traffic channel (TCH) is reserved for the call to be set up. Otherwise, connecting the call to the cell 110 is blocked or it is directed in a different way to the interference-limited frequency reuse group. Predefining the threshold value L' makes the system accept loads always up till the same maximum point.

In a dynamic channel allocation method of prior art, channel allocation is based on an average of the quality of calls already connected at the time. In practice, the decision on channel allocation is made based on the past situation, and no attempt is made to evaluate the impact of the call to be set up. If the call is initiated very close to the serving base transceiver station BTS1, the interference caused to the adjacent cells 120, 130, 140, 150 is minimal or close to zero. This is due to the low transmission power of both the uplink and the downlink. Also, if the call is initiated at the edge of the serving cell 110, all adjacent cells 120, 130, 140, 150 do not suffer from interference, but only those closest to the initiating call. Thus, the interference impact of the call to be set up is emphasized too much in particular when the call is initiated very close to the serving base transceiver station BTS1 or at the edge of the serving cell 110.

Figure 3:
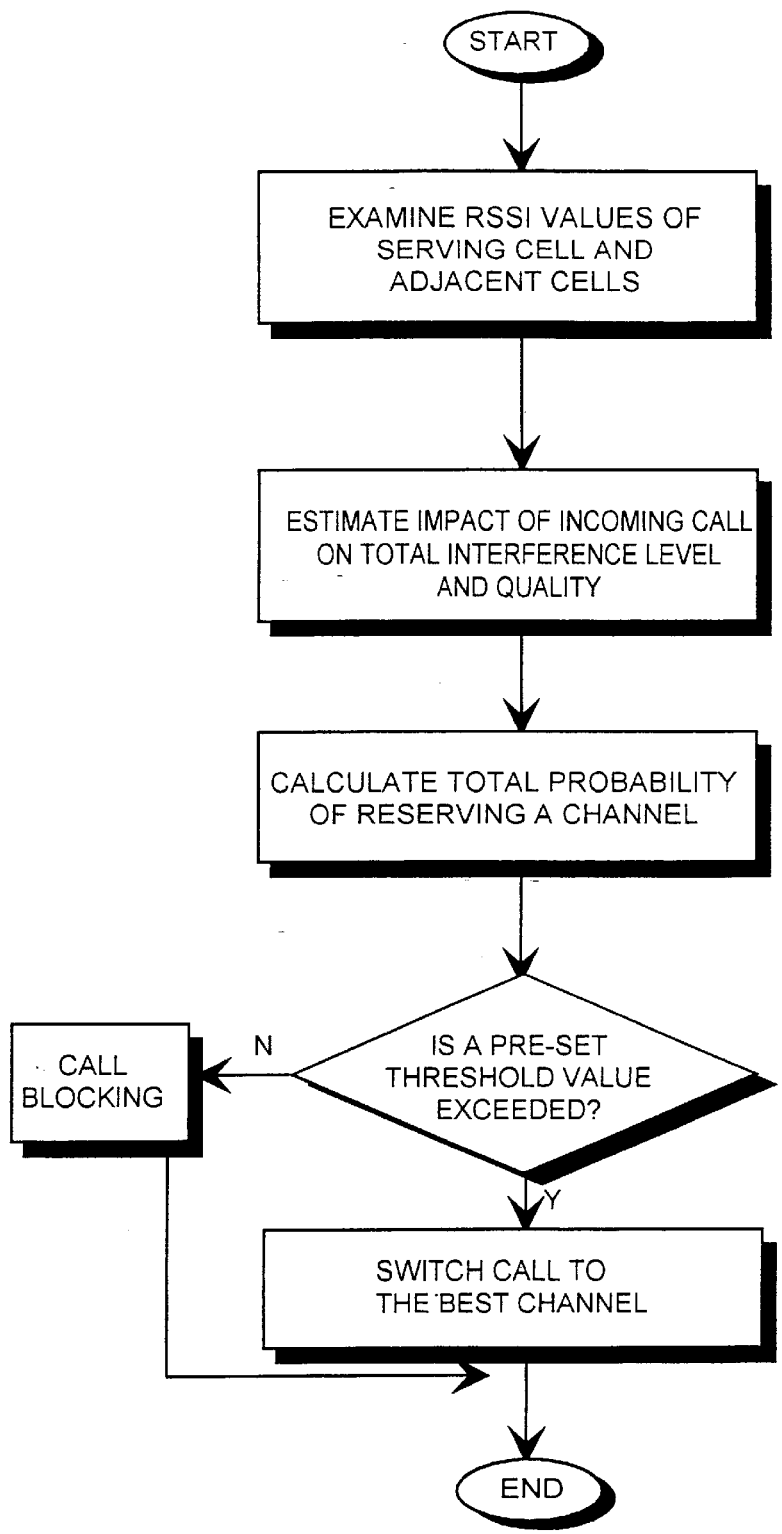
FIG. 3 shows a flow chart illustrating a preferred embodiment of the method of the invention.

FIG. 3 shows a flow chart illustrating a preferred embodiment of the method of the invention. The figure illustrates decision-making on channel allocation according to the method of the invention. When a decision is made on whether a channel be granted to a call to be connected or not, first the location of the subscriber terminal 104 in the radio environment is examined. This is most preferably done by examining the received signal strengths, i.e. RSSI values, of both the serving cell 110 and the adjacent cells 120, 130, 140, 150. If the strength of the signal received by the serving cell 110 is high enough, it can be assumed that the subscriber terminal 104 is very close to the serving base transceiver station BTS1, In such a case, the call can be accepted to the serving cell 110 even though the adjacent cells 120, 130, 140, 150 give poor quality values, because it does not significantly lower the quality of the other cells. This happens, because when the subscriber terminal 104 is close to the serving base transceiver station BTS1, transmission power is low on both uplink and downlink. Similarly, when calculating the total probability P, the cells closest to the incoming call are emphasized.

The impact of an incoming call on the total interference level and quality is estimated by means of the RSSI values. When calculating the probability of reserving a channel, it is noted if the pre-set threshold value L' is exceeded, in which case the call is switched to the best possible channel. If the threshold value L' is not exceeded, the call is blocked.

Figure 4:
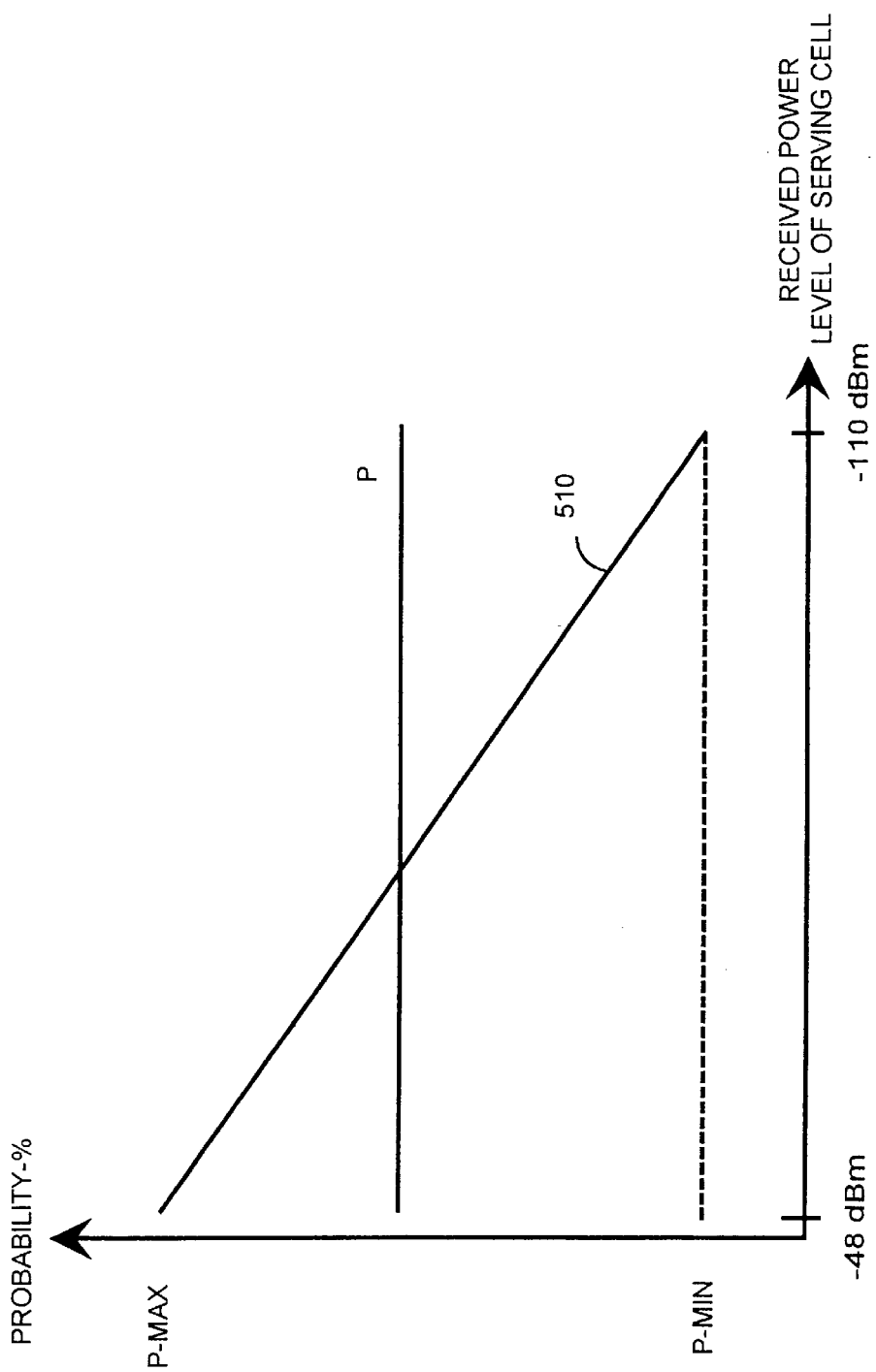
FIG. 4 illustrates a received power level based on probability calculus.

FIG. 4 illustrates a received power level based on probability calculus. FIG. 4 is also included in FIG. 5. The solution of the invention allows variation in the probability value $P_s$ depending on the received power level RxLev of the serving cell 110. Most preferably, linear relation is used, in which case the relation between the received power level RxLev and the probability $P_s$ can be represented by the following formula:

$$P_s(RxLev)=a*RxLev+b, \text{ where}$$

$$a=((P_s)_{max}-(P_s)_{min})/(RxLev_{max}-RxLev_{min}) \text{ and}$$

$$b=(P_s)_{min}.$$

Calculating the relation between the received power level RxLev of the adjacent cells and the probability $P_n$ is done as follows. The parameters of the probability descriptors of the received signal strengths are most preferably dependent on quality. A table is preferably used to calculate variable b, i.e. a suitable quality class and the corresponding probability is selected or, alternatively, a suitable, most preferably linear, modification is used so that a basic probability can directly be calculated from the quality. Thus, one descriptor is obtained, whose location in relation to the y axis is determined on the basis of quality.

The slope of the curve, i.e. variable a, is also most preferably dependent on quality. Then, the user does not have to manually enter several variable parameters, but only variables a and b for each quality class. Thus, the basic probability is always one from a certain received power level onward and the slope depends on quality.

The probability $P_n$ of channel allocation is calculated next. For each cell 120, 130, 140, 150 receiving interference, an average quality is used so that the original probability value P can be calculated. The pre-set initial probability values of quality classes determine the nominal probabilities for different quality classes.

FIG. 5 shows an example of a subscriber terminal 104 which has established a connection to a cell 110 and has three adjacent cells 120, 130, 140, of which the connection probability is calculated. Curve 501 in FIG. 5 represents the probability curve of an adjacent cell with good quality of calls on an average, curve 502 represents the probability curve of an adjacent cell in quality class Q1, curve 503 represents the probability curve of an adjacent cell in quality class Q2, curve 504 represents the probability curve of an adjacent cell in quality class Q3 and curve 505 represents the probability curve of an adjacent cell with poor quality of calls on an average. Curve 510, which is opposite to these curves and also shown in FIG. 4, represents the probability curve of the serving cell. Point 530 is (P1,Q1), point 540 is (P2,Q2) and point 550 is (P3,Q3). Curve 520 represents the nominal level of received power level and probability.

The adjacent cell 120 has an average quality at the first quality level Q2, which means that the Q2 curve is used to read the probability P2 on the basis of the received power level provided by the measuring reports. Other adjacent cells 130, 140 will be similarly handled. This way, probabilities $P_{ni}$ can be derived for each adjacent cell 130, 140. The total probability $P_n$ of the adjacent cells 120, 130, 140 is calculated on the basis of the signal qualities and signal strengths received by the adjacent cells, most preferably with the following formula, when using linear dependency:

$$P_{ni}=a(q)*RxLev(i)+b(q), \text{ where}$$

i is the adjacent cell index, and q is the average quality group for adjacent cell i.

In the formula, variables a an b are either defined as follows $a(q)=(P_{min}(q)-P_{max}(q))/(RxLev_{max}(q)-RxLev_{min}(q))$, $b=P_{max}(q)$, or variables a and b are dependent on quality. The provisional result $P_n$ is thus obtained as $P_n=\Pi P_{ni}$. With this method, it is also possible to allow positive probability for the cells 120, 130, 140 suffering from interference, which provides a poor quality value, but which the subscriber terminal 104 can hear only at a very low signal level. This makes possible calls that cannot affect this particular cell 120, 130, 140 and, thus, unnecessary call blocking is avoided. Similarly, a suitable setting of parameters reduces the probability P also with good quality values if the adjacent cell 120, 130, 140 receives an exceptionally strong signal. Such a situation occurs in high tower buildings or similar locations.

The signals of only the adjacent cells 120, 130, 140 which the subscriber terminal 104 can really interpret are preferably included in the probability calculus. The cells 120, 130, 140 that are defined as cells suffering from interference but that the subscriber terminal 104 does not take into account, are not included in the calculation. This corresponds to providing a probability value $P_n=1$ to these cells 120, 130, 140. When the final probability P is calculated, the received power level RxLev of the serving cell 110 is also taken into account. This way, a higher probability can be allowed for the subscriber terminals 104 that are close to the serving base transceiver station BTS1 and thus suitable for a power adjustment of the uplink and downlink.

When necessary, the final probability P is obtained either with formula $P=P_s*P_n\in[0,1]$, or with formula $P=P_s+P_s+P_n\in[-1,1]$.

Product $P_n=P_{n1}*P_{n2}* \ldots *P_{ni}$ includes a cumulative probability calculated from the data on adjacent cells 120, 130, 140, 150, and $P_s$ represents the probability of received power level obtained with the received signal strength of the serving cell 110. Variable $P_s$ can obtain values between [0,1].

The final probability P of channel allocation can also be calculated with formula $P=P_s+P_n$, where variable $P_s$ is dependent on the received power level $RxLev_s$ of the serving cell 110 and variable $P_n$ is dependent on the received power levels $RxLev_i$ of the adjacent cells 120, 130, 140, 150 and the qualities $RxQual_i$ of the adjacent cells 120, 130, 140, 150. Here, the probabilities can obtain the same values as before, but the probability $P_s$ can also have a suitable positive or negative value between [−1,1], in which case the final probability P would produce the desired result. Here, a sufficiently high value of variable $P_s$ guarantees that the call is accepted regardless of the value of variable $P_n$. With this method, it is thus possible to separately control the impact of the received power level $RxLev_s$ of the serving cell 110 on the probability P.

Even though the invention has been explained in the above with reference to examples in accordance with the accompanying drawings, it is obvious that the invention is not restricted to them but can be modified in many ways within the scope of the inventive idea disclosed in the above and in the attached claims.

What is claimed is:

1. A channel allocation method in a cellular radio network that includes at least one base transceiver station and at least one subscriber terminal connected to the base transceiver station over a bi-directional radio link wherein:

in the channel allocation decision, an impact of a possible channel allocation on an interference level of the cellular radio network is taken into account;

a prediction on the impact of a possible channel allocation on the interference level of the cellular network is made based on the received power level ($RxLev_s$) of the serving cell, the received power level ($RxLev_i$) of the adjacent cells and the signal qualities ($RxQual_i$) of the adjacent cells;

a probability $P=P_s*P_n$, is calculated for channel allocation, where variable $P_s$ is dependent on the received power level ($RxLev_s$) of the serving cell and variable $P_n$ is dependent on the received power level ($RxLev_i$) of the adjacent cells and the signal qualities ($RxQual_i$) of the adjacent cells;

variable $P_n=\Pi P_{ni}$, where $P_{ni}$ represents the probability on base transceiver station i and where variable $P_{ni}$ obtains values between 0 and 1; and variable $P_{ni}$ is calculated linearly according to equation $P_{ni}=a*RxLev_i+b$, where variable a is dependent on signal quality ($RxQual_i$) and variable b is dependent on signal quality ($RxQual_i$).

2. The method of claim 1, wherein a call is accepted to a desired frequency reuse group, if the probability P exceeds a pre-set threshold value.

3. The method of claim 1, wherein that a call is accepted to a desired frequency reuse group, if the probability P exceeds a randomly selected threshold value.

4. The method of claim 1, wherein variable $P_s$ obtains values between 0 and 1.

5. A system for channel allocation in a cellular radio network which includes at least one base transceiver station and at least one subscriber terminal connected to the base transceiver station over a bi-directional radio link and a serving cell, wherein the serving cell is arranged to perform channel allocation by predicting the impact of a possible channel allocation on an interference level of the cellular radio network;

the cellular radio network further includes a serving cell and adjacent cells to the serving cell;

the system is arranged to predict the impact of a channel allocation on the interference level of the cellular network based on the received power level ($RxLev_s$) of the serving cell, the received power level ($RxLev_i$) of the adjacent cells and the signal qualities ($RxQual_i$) of the adjacent cells;

the system is arranged to calculate a probability $P=P_s*P_n$ for channel allocation, where variable $P_s$ is dependent on the received power level ($RxLev_s$) of the serving cell and variable $P_n$ is dependent on the received power level ($RxLev_i$) of the adjacent cells and the signal qualities ($RxQual_i$) of the adjacent cells;

the variable $P_n=\Pi P_{ni}$, where $P_{ni}$ represents the probability on base transceiver station i and where variable $P_{ni}$ obtains values between 0 and 1; and the system is arranged to calculate variable $P_{ni}$ linearly according to formula $P_{ni}=a*RxLev_i+b$, where variable a is dependent on signal quality ($RxQual_i$) and variable b is dependent on signal quality ($RxQual_i$).

6. The system of claim 5, wherein the system is arranged to accept the call to a desired frequency reuse group, if the probability P exceeds a pre-set threshold value.

7. The system of claim 5, wherein the system is arranged to accept the call to a desired frequency reuse group, if the probability P exceeds a randomly selected threshold value.

8. The system of claim 5, wherein the values of variable $P_s$ are between 0 and 1.

* * * * *